United States Patent [19]

Kaku et al.

[11] Patent Number: 5,550,811
[45] Date of Patent: Aug. 27, 1996

[54] SYNC ACQUISITION AND TRACKING CIRCUIT FOR DS/CDMA RECEIVER

[75] Inventors: Tomoya Kaku; Sean O'Regan, both of Tokyo, Japan

[73] Assignee: NEC Corporation, Japan

[21] Appl. No.: 367,108

[22] Filed: Dec. 30, 1994

[30] Foreign Application Priority Data

Dec. 30, 1993 [JP] Japan .................... 5-354554

[51] Int. Cl.$^6$ ................................. H04B 1/707
[52] U.S. Cl. ............................................ 370/18
[58] Field of Search ................... 370/8, 9, 10, 11, 370/12, 18, 19, 20, 21, 22, 23, 32.1, 94.1, 60.1, 60; 375/200, 201, 202, 203, 205, 206, 207, 208, 209, 210, 237, 238, 239, 235, 232, 242, 241, 245, 256, 261, 269, 283, 367; 379/410, 408, 409

[56] References Cited

U.S. PATENT DOCUMENTS 5,420,850  5/1995  Umeda et al. ..................... 370/18

Primary Examiner—Douglas W. Olms
Assistant Examiner—Dang Ton
Attorney, Agent, or Firm—Ostrolenk, Faber, Gerb & Soffen, LLP

[57] ABSTRACT

In a sync acquisition and tracking circuit for a DS/CDMA receiver, phase position signals are sequentially and cyclically selected at a specified rate higher than the rate at which Rayleigh fading occurs. The selected signal is used to control the phase of PN sequences. Correlation is taken between spread pilot signals and the orthogonal PN sequences at a chip rate to produce despread pilot signals, which are integrated to produce a correlation value. A set of accumulators are provided, which are sequentially and cyclically selected at the specified rate. The correlation value is applied to the selected accumulator to produce a total sum of correlation values. The highest total sums are selected from the outputs of all accumulators, and corresponding phase position signals are identified. A set of orthogonal despreading sequences are generated corresponding to the identified phase position signals for application to the receiver.

12 Claims, 4 Drawing Sheets

PHASE SHIFT CONTROLLER 45

SYNC ACQUISITION AND TRACKING CIRCUIT FOR DS/CDMA RECEIVER

BACKGROUND OF THE INVENTION

1. Field of the Invention

The present invention relates generally to direct sequence spread spectrum (code division multiple access) receivers. This invention is particularly concerned with a sync acquisition and tracking technique for direct sequence spread spectrum receivers of cellular mobile communications systems in which transmitted signals are severely affected by Rayleigh fading.

2. Description of the Related Art

Commercial interest in direct sequence spread spectrum communication systems has recently risen due to their potential ability to provide service to more users than is offered by other multiple access techniques. In the cell-site station of the DS/CDMA system, a data symbol is spread by multiplying it with higher frequency orthogonal pseudo-random number (PN) sequences assigned to the cell site as well as with orthogonal Walsh codes assigned to the channel over which the spread signal is transmitted. In order to enable the mobile station to implement synchronous acquisition and tracking operations, a pilot signal is superimposed on the data symbol sequence. At the mobile station, a sliding correlation technique is used to shift the phase timing of a local PN sequence by a predetermined amount each time a correlation is taken between the received and local sequences and determine the correct phase timing for the local sequence when the correlation exceeds some critical value. Once synchronization is established, the phase difference is monitored and maintained to within a fraction of the chip interval. During transmission, the signal undergoes reflections from various land structures, producing a complex pattern of standing waves due to mutual interference of the multipath signals at the mobile station. As a result, the propagation path of the signal exhibits a field intensity distribution which is approximated by the Rayleigh distribution. Thus, the signal experiences a phenomenon called "Rayleigh fading" and the envelope of the signal at the mobile station as well as its phase violently fluctuate.

Under such unfavorable conditions, the sliding correlation technique is not ideal for maintaining phase timing of the local PN sequence in response to the rapidly changing signal variation. More specifically, with prior art DS/CDMA receivers phase shifting is performed at such intervals that if the pilot signal is despread at a trough of Rayleigh fading the correlation is low even if the local clock timing is in sync with the transmitted chip-rate clock. Conversely, if the pilot signal is despread at a peak of Rayleigh fading, the correlation is high even if the local timing is somewhat out of sync with the transmitted clock. Additionally, because of the cost consideration, the degree of precision required for the clock generator for mobile station use is not as high as that of the clock generator used at cell sites. Due to the low degree of precision, the mobile's window interval is not always constant, causing a frequency offset to occur between the local and transmitted clock.

SUMMARY OF THE INVENTION

It is therefore an object of the present invention to provide a precision sync acquisition and tracking circuit for a direct sequence spread spectrum receiver.

According to the present invention, there is provided a sync acquisition and tracking circuit for a direct sequence spread spectrum receiver which receives in-phase and quadrature data signals and in-phase and quadrature pilot signals. The sync acquisition and tracking circuit comprises a register for storing a plurality of phase position signal. A first selector cyclically selects each one of the phase position signals in response to a shift command signal which is generated at a rate higher than the rate at which Rayleigh fading occurs. A pseudo-random number (PN) generator is provided for producing orthogonal PN sequences in accordance with the selected phase position signal. A correlator takes correlation between the in-phase and quadrature spread pilot signals and the PN sequences at a chip rate to produce in-phase and quadrature despread pilot signals and integrating the in-phase and quadrature despread pilot signals at predetermined intervals to produce a correlation value. A plurality of accumulators are provided. A second selector responds to the shift command signal by cyclically selecting each one of the accumulators and applying the correlation value from the correlator to the selected accumulator to thereby cause it to produce a total sum of the correlation values which are produced by the correlator during the time the phase position signals are being repeatedly selected and applied to the PN sequence generator. At least the highest total sum is selected from the outputs of all accumulators, and a corresponding phase position signal is identified. Despreading sequences are generated corresponding to the identified phase position signal and applied to the direct sequence spread spectrum receiver to despread incoming signals.

For applications wherein signals are received through multipath fading channels and a plurality of demodulators are provided respectively for the multipaths, a plurality of higher total sums are selected from the outputs of all search accumulators, and corresponding phase position signals are identified. A plurality of orthogonal despreading sequences are generated corresponding respectively to the identified phase position signals and applied to the plurality of demodulators, respectively, to despread incoming signals.

Since the phase position signal is varied at intervals smaller than the Rayleigh fading intervals and correlations are taken for each accumulator at similar points with respect to troughs or peaks of the Rayleigh fading profile, Rayleigh-fading related signal power variations are distributed and averaged out for each correlation sum.

BRIEF DESCRIPTION OF THE DRAWINGS

The present invention will be described in further detail with reference to the accompanying drawings, in which.

DETAILED DESCRIPTION

Figure 1:
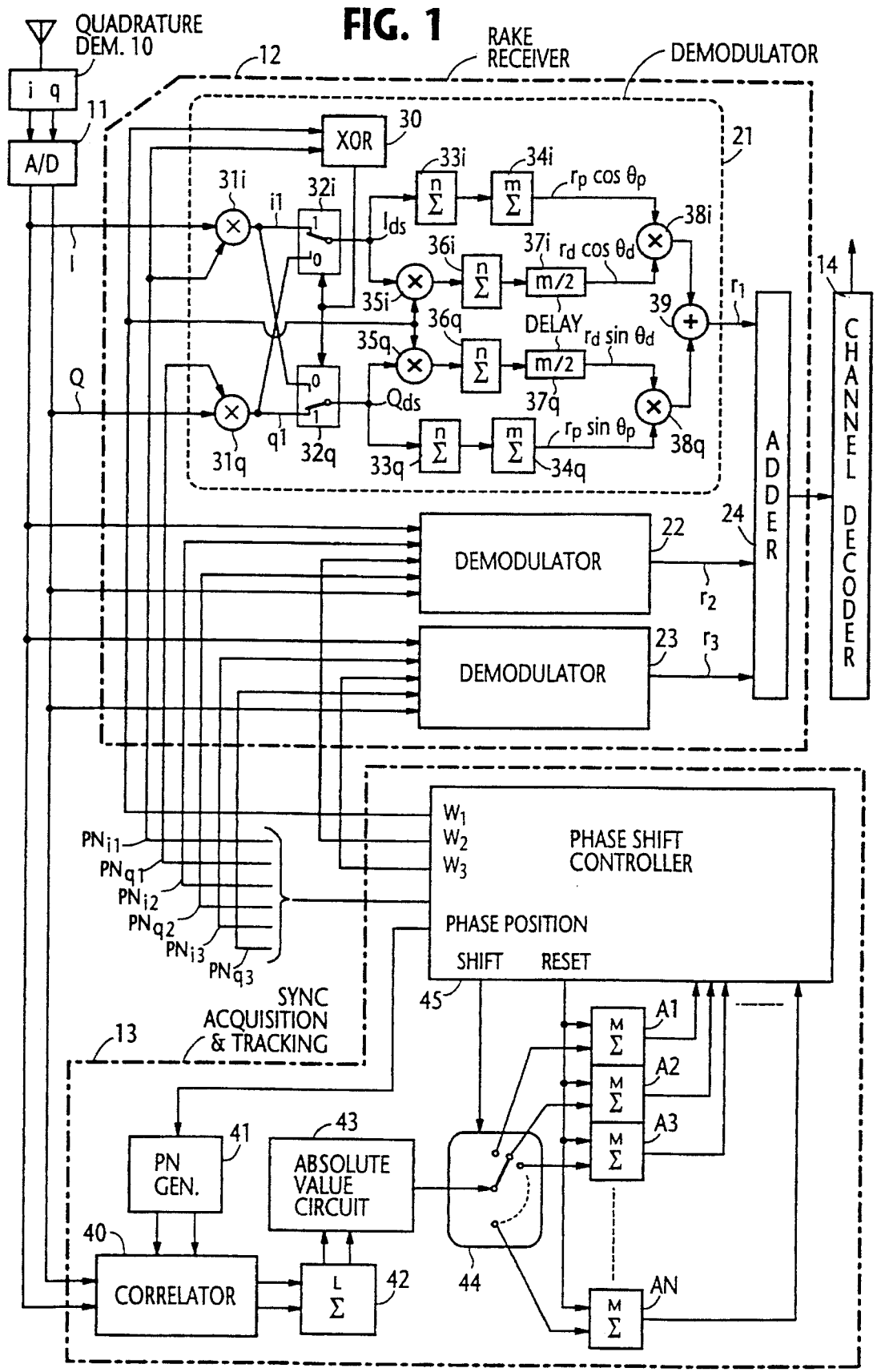
FIG. 1 is a block diagram of a direct sequence spread spectrum receiver according to the present invention.

Referring now to FIG. 1, there is shown a receiving circuit of a mobile station for a DS/CDMA cellular communications system according to the present invention. At a cell-site station, a baseband downlink (cell-to-mobile) signal is initially encoded by a channel encoder into a known coded form that is optimized for radio transmission. At the chip rate much higher than the symbol rate, the symbols of the encoded signal are spread with PN (pseudo-random number) spreading sequences $PN_i$ and $PN_q$ commonly assigned to the service area in which the mobile station is currently located and further spread with orthogonal Walsh codes uniquely assigned to the downlink channel. A pilot signal, which may be a series of all zeros or ones, is spread at the same chip rate with the same PN sequences $PN_i$ and $PN_q$ with orthogonal Walsh all-zero codes. The in-phase and quadrature components of spread spectrum downlink signal are combined with the corresponding components of spread spectrum pilot signal to produce an I signal and a Q signal which are modulated onto orthogonal radio-frequency carriers, amplified and transmitted.

The spread spectrum signal from the cell-site is received by the mobile station and supplied to a quadrature demodulator 10 which includes radio-frequency amplification and demodulation stages. Using orthogonal local carriers, the demodulator 10 recovers the original in-phase signal and quadrature signal q. Preferably, an analog-to-digital converter 11 is used to convert the i and q signals to digital form. The receiving circuit includes a RAKE receiver 12, a sync acquisition and tracking circuit 13, and a channel decoder 14.

The RAKE receiver 12 includes a plurality of identical demodulators 21, 22 and 23. For practical purposes, three demodulators are sufficient to take the multipath-fading related problem into consideration. For clarity, only demodulator 21 is shown in detail. Demodulator 21 includes a pair of multipliers 31$i$ and 31$q$ for multiplying the I and Q digital signals from A/D converter 11 with the pseudo-random despreading sequences $PN_{i1}$ and $PN_{q1}$ to produce an in-phase output $i_1 = I \times PN_{i1}$ from multiplier 31$i$ and a quadrature output signal $q_1 = Q \times PN_{q1}$ from multiplier 31$q$. The PN sequences $PN_{i1}$ and $PN_{q1}$ are the two inputs to an exclusive-OR gate 30 producing a switching signal. The output signal $i_1$ of multiplier 31$i$ and the output signal $q_1$ of multiplier 31$q$ are the inputs to switches 32$i$ and 32$q$. If the switching signal is a binary 1, the output of multiplier 32$i$ appears at the output of switch 32$i$ as a signal $I_{ds}$. If the switching signal is a binary 0, the signal $I_{ds}$ is equal to the output of multiplier 32$q$, i.e., $q_1$. Similarly, the output of multiplier 31$q$ appears at the output of switch 32$q$ as a signal $Q_{ds}$ when the switching signal is 1. Otherwise, the output of multiplier 31$i$ appears as $Q_{ds}$. Since the pilot signal was spread at the transmitter with the all-zero Walsh code, signals $I_{ds}$ and $Q_{ds}$ represent the in-phase and quadrature components of the despread pilot signal.

To extract the pilot signal components, the in-phase and quadrature signals $I_{ds}$ and $Q_{ds}$ are respectively supplied to integrators 33$i$ and 33$q$ where they are integrated over the period of "n" chips (where n represents the number of chips with which the data symbol was spread at the transmitter). In order to absorb random noise, the integrators 33$i$ and 33$q$ are respectively followed by additional integrators, or moving average circuits 34$i$ and 34$q$ where the integrated $I_{ds}$ and $Q_{ds}$ signals are summed continuously over the period of m symbols, (where m is a predetermined number).

More specifically, each of the moving average circuits is implemented with an m-stage shift register and an adder. The shift register receives an input signal from the preceding circuit and the adder is connected to all the stages of the register for successively summing the values of their contents so that the adder produces a signal representing the moving average of the values of m pilot symbols (corresponding to m data symbols) for each phase component.

Since the data signal was spread with the channel-identifying Walsh code at the transmitter, the $I_{ds}$ and $Q_{ds}$ signals are applied to multipliers (correlators) 35$i$ and 35$q$, respectively, where they are multiplied with a local Walsh code $W_j$ (where j=1) supplied from the sync acquisition and tracking circuit 13. The outputs of multipliers 35$i$ and 35$q$ are fed into integrators 36$i$ and 36$q$, respectively, where they are integrated over an n-chip interval to produce a replica of the original symbol for each phase component. The outputs of integrators 36$i$ and 36$q$ are supplied respectively to delay circuits 37$i$ and 37$q$ each introducing a delay of m/2 symbols. Each of the in-phase and quadrature data symbols is delayed by the interval of m/2 symbols so that the delayed symbol of each phase component corresponds to the mid-point stage of the moving average shift register. Thus, for each delayed data symbol, a moving average value is derived from m/2 pilot symbols that precede the delayed symbol as well as from m/2 pilot symbols that succeed it.

If the chip-rate timing of the PN sequences $PN_{i1}$, $PN_{q1}$ and the Walsh code $W_1$ is in proper phase relationship with the incoming I and Q signals, the dispersed energies of the incoming signals are despread (concentrated) and the pilot signal components will appear with high amplitude at the outputs of integrators 34$i$ and 34$q$ as $r_p \cos \theta_p$ and $r_p \sin \theta_p$, respectively, and the data signal components will appear with high amplitude at the outputs of m/2 symbol delay circuits 37$i$ and 37$q$ as $r_d \cos \theta_d$ and $r_d \sin \theta_d$, respectively.

Figure 3:
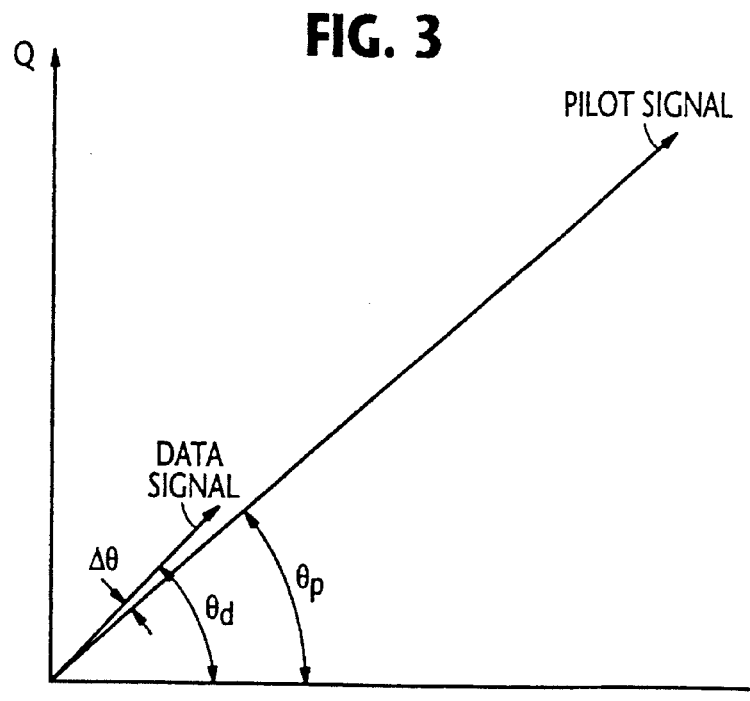
FIG. 3 is a graphic representation of data signals and pilot signals in a complex plane.

The vectors of the pilot and data signals are shown in FIG. 3. As indicated by the coordinate system of the I-Q complex plane, the amplitude of the pilot signal is usually much higher than that of the data signal and between $\theta_p$ and $\theta_d$ there is a difference $\Delta\theta$ which is negligibly small as compared with $\theta_p$ and $\theta_d$. In order to obtain the output signal $r_1$ for the demodulator 21 the data signal vector is projected onto the I axis of the coordinate system by multiplying each data signal component with a complex conjugate of the corresponding pilot signal component and summing the products as follows:

$$
\begin{aligned}
r_1 &= Re[r_d \cos \theta_d (r_p \cos \theta_p - j r_p \sin \theta_p) + r_d \sin \theta_d (r_p \sin \theta_p + j r_p \cos \theta_p)] \\
&= Re[r_p r_d(\cos \theta_p \cos \theta_d + \sin \theta_p \sin \theta_d) + j r_p r_d(\cos \theta_p \sin \theta_d - \sin \theta_p \cos \theta_d)] \\
&= r_p r_d(\cos \theta_p \cos \theta_d + \sin \theta_p \sin \theta_d) \\
&= r_p r_d \cos(\theta_p - \theta_d)
\end{aligned}
\quad (1)
$$

Equation (1) indicates that a unit vector of the data signal is rotated clockwise to the I axis of the I-Q complex plane and weighted by the scalar product $r_p r_d$.

If several data symbols are severely corrupted by noise during transmission, the corresponding pilot symbols are moving-averaged and the effect of the noise on the pilot signal is reduced in this manner, leading to a reduction in the effect of the noise on the signal r1.

Returning to FIG. 1, the output signal $r_1$ is obtained by multiplying the in-phase pilot signal component with the in-phase data signal component by a multiplier 38$i$ to produce an in-phase product and multiplying the quadrature pilot signal component with the quadrature data signal component by a multiplier 38$q$ to produce a quadrature product, and summing both products by an adder 39.

In like manner, output signals $r_2$ and $r_3$ are produced by demodulators 22 and 23 and summed with the output signal $r_1$ of demodulator 21 by adder 24 and supplied to the channel decoder 14 where the adder output undergoes a process inverse to that of the transmitter's channel encoder.

Rotation of the data vector onto the I-axis of the I-Q complex plane allows for the simple summation of the signals $r_1$, $r_2$ and $r_3$ in adder 24. The use of the pilot vector in the rotation method described above reduces the effect of fading on the signal outputted from adder 24 as the pilot vector weights the data symbol and stronger multipath signals will have stronger moving-averaged pilot strong signals which indicate low levels of fading.

Sync acquisition and tracking circuit 13 includes an orthogonal correlator 40 and a PN sequence generator 41 which generates orthogonal despreading sequences in accordance with a phase position signal from a phase shift controller 45. As will be described, the phase shift signal is generated at "window" intervals "Tw" much smaller than the intervals at which Rayleigh fading occurs. The window interval Tw is equal to L×Tc, where Tc is the chip rate and L which is chosen such that during the interval of L successive chips the pilot signal never experiences more than $\pi/2$ radian rotation) PN sequence generator 41 is phase-shifted at intervals Tw and the phase shift is cyclically repeated when the PN sequence generator 41 is phase-shifted N times for each cycle (where N represents the number of phases to be shifted within interval Tw×N). The I and Q data signals from A/D converter 11 are applied to the correlator 40 where the I and Q pilot signal components are despread and correlation values are detected for each pilot signal phase component during the window interval Tw. To the output of correlator 40 is connected an L-chip integrator 42 where the correlation values of each pilot signal phase component for "L" chips are summed to produce sum vectors for the in-phase and quadrature phase components of the pilot signal. The outputs of integrator 42 are fed into an absolute value circuit 43 which derives a scalar value of the resultant vector of these two vector components (i.e., the root of a sum of squares of each sum vector component) to represent the magnitude of the pilot's cross-correlation within the window interval Tw.

The output of absolute value circuit 43 is applied to an input selector 44 which is controlled by the phase shift signal to change terminal positions of its moving contact arm. Accumulators A1 to AN are connected respectively to the terminal positions of selector 43. Each of the accumulators A1 to AN provides a sum of M input signals from the corresponding terminal of selector 43 and reset in response to a signal from the phase shift controller 45. The outputs of accumulators A1 to AN are supplied to the controller 45 Where they are compared with other sums to determine their ranks and select the highest three correlation values.

Figure 2:
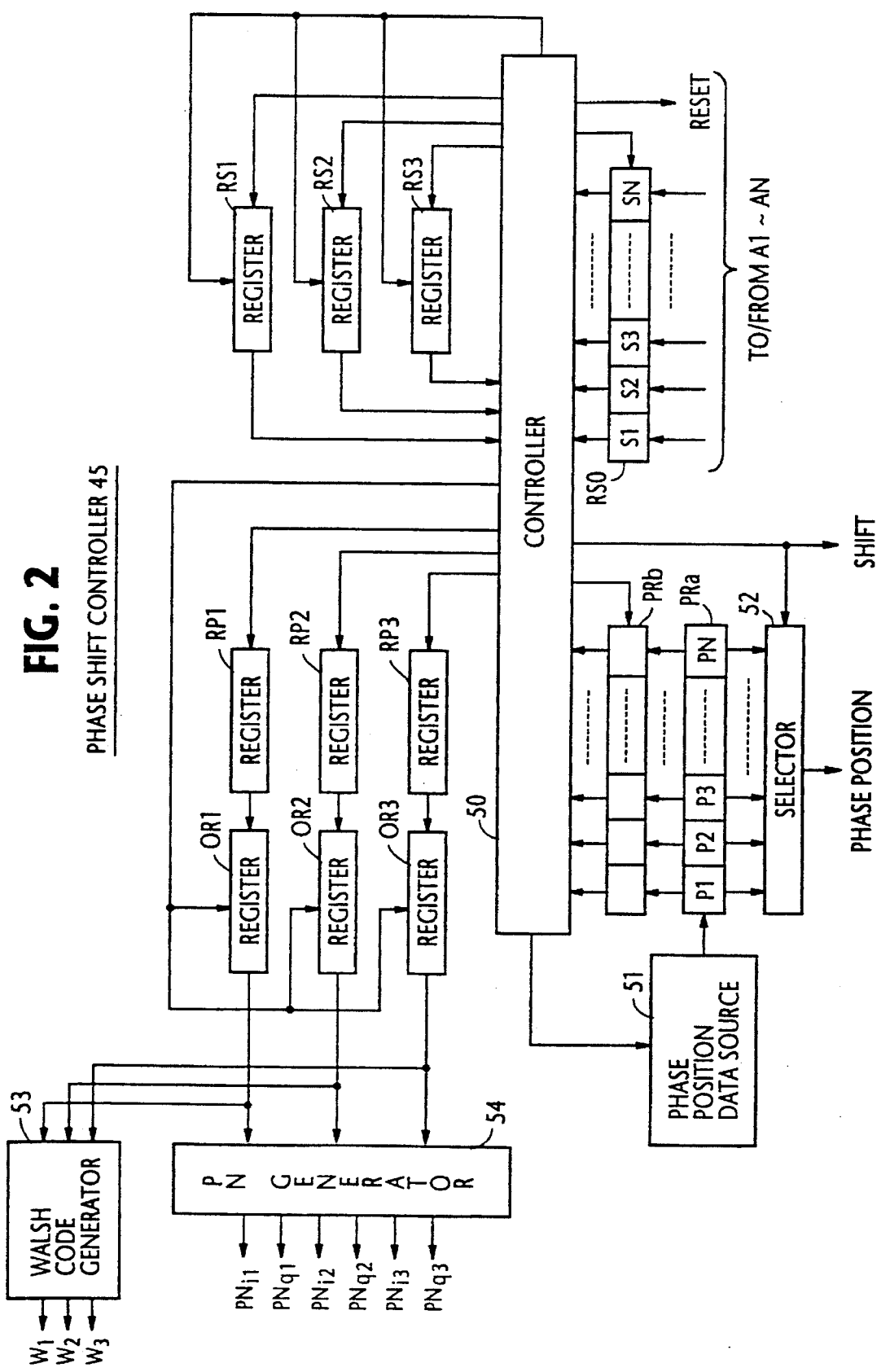
FIG. 2 is a block diagram of the phase shift controller of the sync acquisition and tracking circuit of FIG. 1.

As shown in detail in FIG. 2, the phase shift controller 45 includes a register PRa for storing phase position signals P1 ($=\phi_0+\Delta\phi$) through PN ($=\phi_0+N\Delta\phi$) loaded from a phase position data source 51, and a register RS0 for storing correlation sum signals S1 to SN loaded from accumulators A1 to AN. Each of the phase position signals stored in register PRa is selectively supplied through a selector 52 to the PN sequence generator 41. The loading of appropriate signals into registers PRa and RS0 and the selecting of a phase position signal by selector 52 are controlled by a controller 50. Registers RS1~RS3 and RP1~RP3 and connected to controller 50. The highest three correlation sums are stored into registers RS1 to RS3, respectively, and corresponding phase position signals are stored into registers RP1 to RP3. The phase position signals stored in registers RP1~RP3 are loaded into output registers OR1~OR3, respectively, which are coupled to a Walsh code generator 53 and a PN sequence generator 54. Using the phase position signals stored in the output registers, Walsh codes W1, W2, W3, and three sets of orthogonal PN sequences $PN_{i1}$, $PN_{q1}$, $PN_{i2}$, $PN_{q2}$, $PN_{i3}$, $PN_{q3}$. are generated and supplied to the demodulators 21, 22 and 23, respectively.

Initially, controller 50 commands a phase position data source 51 to load a set of phase position signals P1~PN into register PRa. Controller 50 includes a clock generator (not shown) and, using its clock, it generates a shift command pulse at intervals Tw and feeds it to selectors 44 and 52. The phase position signals P1~PN are successively selected in response to the shift command signal and applied to the PN sequence generator 41. In response to each phase position signal, the PN sequence generator 41 shifts the phase timing of despread PN sequences by $k\Delta\phi$ (where k=1, 2, ... N). During each successive window interval Tw, L correlation values are summed by integrator 42 and applied through selector 44 to one of the accumulators A1 to AN which corresponds to the phase position signal applied during that window interval to the PN sequence generator 41. The process is repeated M times for each phase position signal and hence for each accumulator so that in the accumulator a total sum of M correlation values is stored for the corresponding phase position. When the shift command signal is generated repeatedly N×M times, the phase position signals are transferred from register PRa to a register PRb to allow a new set of phase position signals to be loaded into register PRa, while allowing the transferred phase position signals to be used during a subsequent process for the determination of higher correlation sums. At the same time, the correlation sums in the accumulators A1~AN are loaded into register RS0 for making comparisons with each other to select the first, second and third largest values of correlation sums and loading corresponding phase position signals from register PRb into output registers OR1~OR3.

Figure 4:
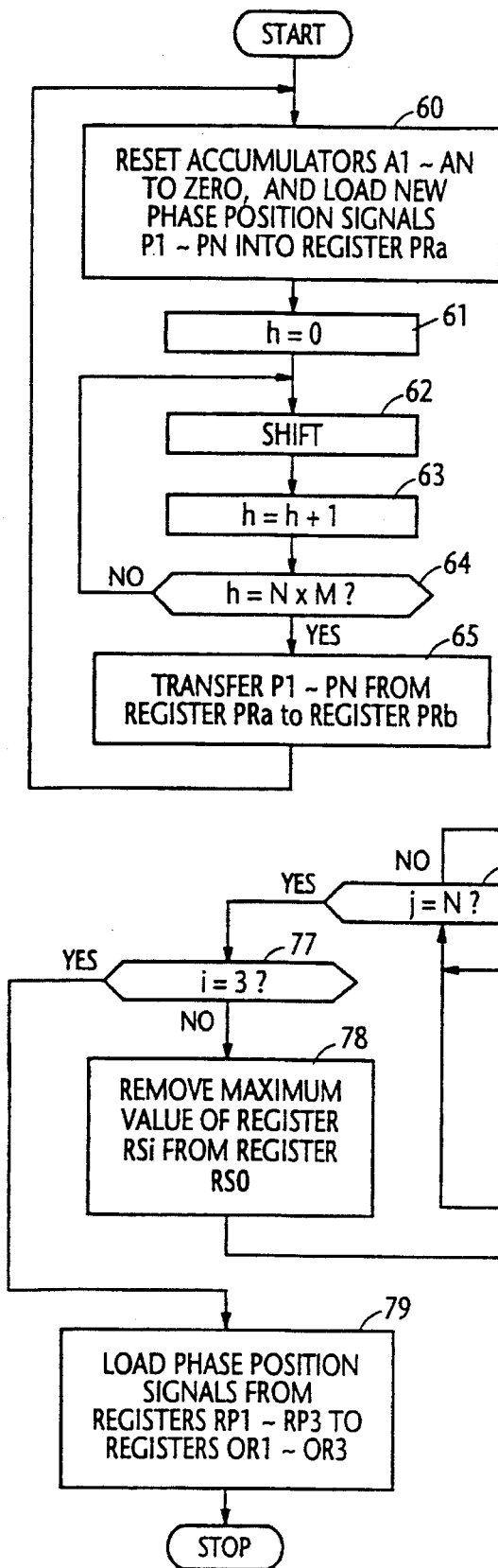
FIGS. 4 and 5 are flowcharts describing sequences of operation performed by the controller of FIG. 2.
Figure 5:
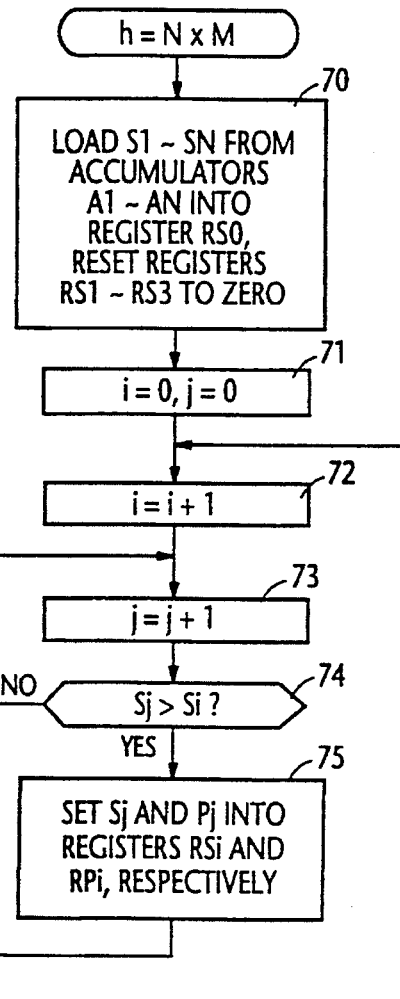

The operation of the controller 50 will be fully described using the flowcharts of FIGS. 4 and 5. In FIG. 4, sync acquisition starts with step 60 to reset all accumulators A1 to AN and load a set of N new phase position signals P1~PN into register PRa from data source 51. Exit then is to step 61 to initialize a count variable h to zero. Control proceeds to step 62 to supply a shift command pulse to selectors 44 and 52, so that phase position signal P1 is initially supplied to PN generator 41, and over L times correlation values are generated by correlator 40, summed by integrator 42 and stored in accumulator A1. At step 63, count variable h is incremented by one and a check is made at step 64 to see if h is equal to or greater than N×M. If not, control returns to step 62 to read phase position signal P2 from register PRa into PN generator 41 and controller 50, and a sum of resultant L correlation values is stored in accumulator A2. Similar operations proceed until the decision at step 64 becomes affirmative, whereupon totals of correlation sums S1 through SN are stored in accumulators A1~AN for phase position signals P1~PN. Control proceeds to step 65 to transfer the phase position signals from register PRa to register PRb, and returns to step 60 to repeat the shift operation for a set of new phase positions.

In FIG. 5, a read operation starts at step 70 when h is equal to N×M by loading correlation sums S1~SN from accumulators A1~AN into register RS0 and resetting registers RS1, RS2 and RS3 to zero. At step 71, count variables i and j are reset to zero and successively incremented by one at steps 72 and 73. Count variable i (where i=1 to 3) identifies the registers RP1~RP3 and RS1~RS3 and variable j (where j=1 to N) identifies the phase position signal P1~PN and the correlation sums S1~SN. At decision step 74, the correlation sum Sj in register RS0 is compared to a correlation sum Si previously stored in register RSi. If Sj is larger than Si, control branches at step 74 to step 75 to set correlation sum Sj into register RSi, and locate the corresponding phase position signal Pj in register PRb and set it into register RPi. If Sj is smaller than Si, control branches to step 76 to check to see if j is equal to N. If j is not equal to N, steps 73, 74 and 75 are repeated to test for the relative value of the next correlation sum Sj with Si. Thus, S1 is initially determined to be larger than the previous value since the latter is zero and stored into register RS1 as data Si and the next correlation sum S2 is compared with S1. If S2<S1, steps 73 to 74 are repeated, and if S2>S1, S1 is replaced in register RS1 with S2 at step 75.

When a maximum correlation sum is determined for a set of N correlation value, the decision at step 76 becomes affirmative, and control exits the loop and enters decision step 77 to check to see if i=3. If not, control proceeds to step 78 to remove the maximum value of register RSi from the register RS0, and control returns to step 72 to repeat the process until a third highest value is determined and stored in register RS3. When this occurs, the decision at step 77 becomes affirmative, and control advances to step 79 to load the phase position signals from registers RP1~RP3 into output registers OR1~OR3.

In this way, three correlation sums from the highest value are determined for a set of N correlation sums and corresponding phase position signals are stored in output registers OR1, OR2 and OR3. During the read operation, the shift operation is in progress for the next set of correlation sums for the next phase position signals.

Figure 6:
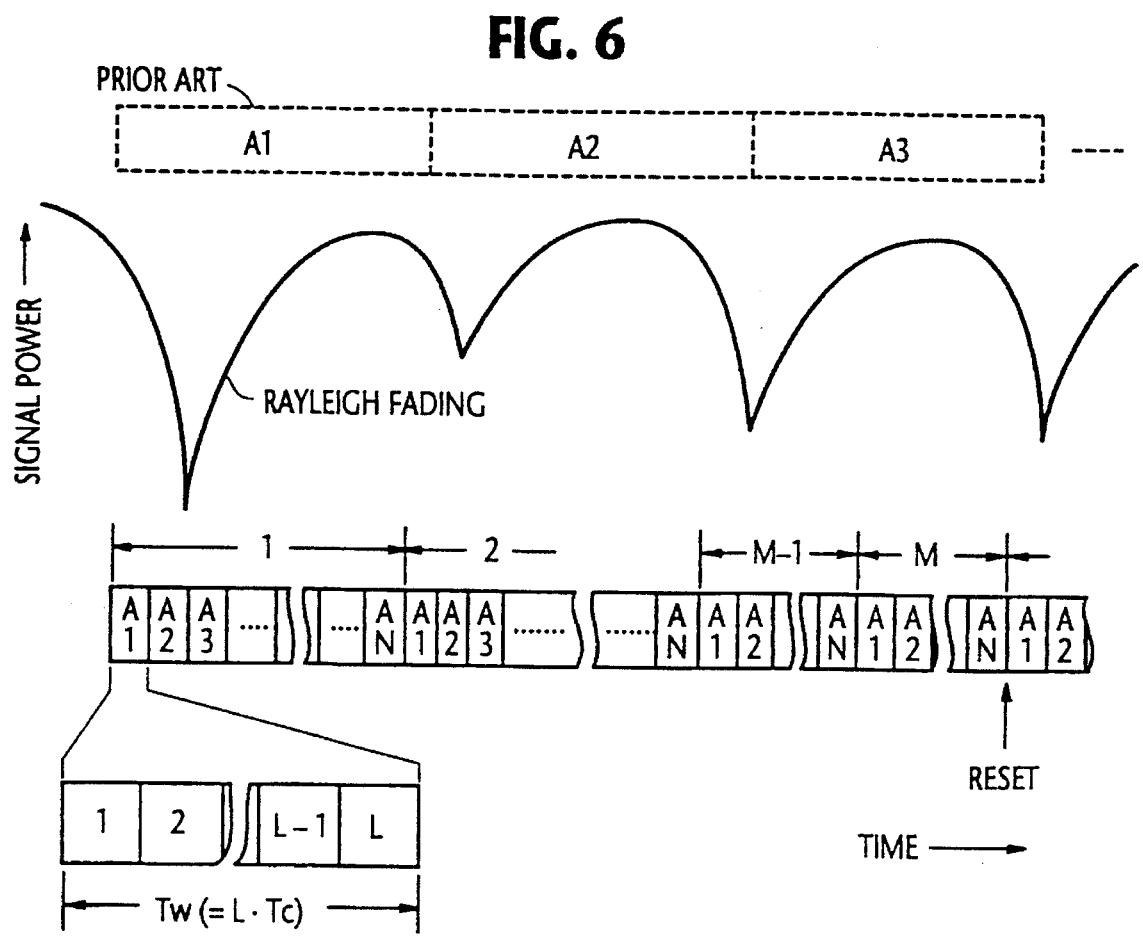
FIG. 6 is a timing diagram illustrating a series of correlation values accumulated in the accumulators of FIG. 1 in relation to the signal power that varies with Rayleigh fading.

Since the window interval Tw is much smaller than any of the intervals at which Rayleigh fading occurs and correlations are taken from sample points distributed at intervals Tw×N as illustrated in FIG. 6, Rayleigh-fading related signal power variations are also distributed and averaged out for each correlation sum. Whereas, the prior art sync acquisition and tracking circuit using a sliding window correlator has a longer window interval for correlation sums A1, A2 and A3 as indicated by dotted lines. As a result, each correlation sum of the prior art is severely affected by Rayleigh fading.

The integer M is chosen so that the product L×M, which gives an amount of chips that can be used to correct samples from the pilot signal, is sufficient to provide a valid correlation sum for each phase position, and the interval L×M×N within which N correlation sums are produced, is chosen at a value which does not exceeds beyond the tolerance of maximum frequency shift.

What is claimed is:

1. A sync acquisition and tracking circuit for a direct sequence spread spectrum receiver which receives in-phase and quadrature data signals and in-phase and quadrature pilot signals, comprising:

register means storing a plurality of phase position signals;

first selector means cyclically selecting each one of said phase position signals in response to a shift command signal;

a pseudo-random number (PN) generator for producing orthogonal PN sequences in accordance with the selected phase position signal;

correlator means multiplying the in-phase and quadrature spread pilot signals with the orthogonal PN sequences of the PN generator at a chip rate to produce in-phase and quadrature despread pilot signals and integrating the in-phase and quadrature despread pilot signals at predetermined intervals to produce a correlation value;

a plurality of accumulator means;

second selector means cyclically selecting each one of said accumulator means in response to said shift command signal and applying the correlation value to the selected accumulator means, whereby each of said accumulator means produces a total sum of the correlation values which are produced by said correlator means while said phase position signals are being cyclically selected and applied to said PN sequence generator; and control means connected to said accumulator means for generating said shift command signal at a rate higher than a rate at which Rayleigh fading occurs, selecting a total sum of the highest correlation value from the total sums of all of said accumulator means, selecting one of said phase position signals which corresponds to the selected total sum, and generating orthogonal despreading sequences corresponding to the selected phase position signals and applying the orthogonal despreading sequences to said direct sequence spread spectrum receiver to despread said in-phase and quadrature data symbols with said orthogonal despreading sequences.

2. A sync acquisition and tracking circuit as claimed in claim 1, further comprising means storing therein a plurality of different sets of phase position signals and loading each one of said sets of phase position signals therefrom into said register means when all of said accumulator means produce said total sums of correlation values for a set of phase position signals currently stored in said register means.

3. A sync acquisition and tracking circuit as claimed in claim 1, wherein said rate at which said shift command signal is generated corresponds to an interval not exceeding π/2 radian rotation of said in-phase and quadrature pilot signals.

4. A sync acquisition and tracking circuit for a direct sequence spread spectrum receiver including a plurality of demodulators for receiving in-phase and quadrature data symbols and in-phase and quadrature pilot symbols, and an adder for summing outputs of the demodulators, the sync acquisition and tracking circuit comprising:

register means storing a plurality of phase position signals;

first selector means cyclically selecting each one of said phase position signals in response to a shift command signal;

a pseudo-random number (PN) generator for producing PN sequences in accordance with the selected phase position signal;

correlator means multiplying in-phase and quadrature spread pilot signals with the PN sequences of the PN generator at a chip rate to produce in-phase and quadrature despread pilot signals and integrating the in-phase and quadrature despread pilot signals at predetermined intervals to produce a correlation value;

a plurality of accumulator means;

second selector means cyclically selecting each one of said accumulator means in response to said shift command signal and applying the correlation value to the selected accumulator means, whereby each of said accumulator means produces a total sum of the correlation values which are produced by said correlator means while said phase position signals are being cyclically selected and applied to said PN sequence generator; and control means connected to said accumulator means for generating said shift command signal at a rate higher than a rate at which Rayleigh fading occurs, selecting total sums of higher correlation values from the total sums of all of said accumulator means, selecting ones of said phase position signals which correspond to the selected total sums, generating a plurality of despreading sequences corresponding to the selected phase position signals, and applying the plurality of despreading sequences to said demodulators, respectively, to despread the in-phase and quadrature data symbols with said plurality of despreading sequences.

5. A sync acquisition and tracking circuit as claimed in claim 4, further comprising means storing therein a plurality of different sets of phase position signals and loading each one of said sets of phase position signals therefrom into said register means when all of said accumulator means produce said total sums of correlation values for a set of phase position signals currently stored in said register means.

6. A sync acquisition and tracking circuit as claimed in claim 4, wherein said rate at which said shift command signal is generated corresponds to an interval not exceeding π/2 radian rotation of said in-phase and quadrature pilot signals.

7. A sync acquisition and tracking method for a direct sequence spread spectrum receiver, the method comprising the steps of:

a) selecting each one of N phase position signals at a rate higher than a rate at which Rayleigh fading occurs;

b) producing pseudo-random number sequences in accordance with the selected phase position signal;

c) multiplying in-phase and quadrature spread pilot signals with the pseudo-random number sequences at a chip rate to produce in-phase and quadrature despread pilot signals and integrating the in-phase and quadrature pilot signals over a plurality of chip intervals to produce a correlation value;

d) accumulating the correlation value to produce a total sum of accumulated correlation values;

e) repeating the steps (a) to (d) M×N times to produce N total sums of accumulated M correlation values;

f) selecting the highest correlation value from the N total sums and selecting one of said phase position signals which corresponds to the selected total sum; and g) generating orthogonal despreading sequences corresponding to the selected phase position signals and applying the orthogonal despreading sequences to said direct sequence spread spectrum receiver.

8. A method as claimed in claim 7, further comprising the step of updating the N phase position signals when the steps (a) to (d) are repeated M×N times.

9. A method as claimed in claim 7, wherein the step (a) selects each of the N phase position signal at a rate which corresponds to an interval not exceeding π/2 radian rotation of said in-phase and quadrature pilot signals.

10. A sync acquisition and tracking method for a direct sequence spread spectrum receiver, the receiver including a plurality of demodulators and an adder for summing outputs of the demodulators, the method comprising the steps of:

a) selecting each one of N phase position signals at a rate higher than a rate at which Rayleigh fading occurs;

b) producing pseudo-random number sequences in accordance with the selected phase position signal;

c) multiplying in-phase and quadrature spread pilot signals with the pseudo-random number sequences at a chip rate to produce in-phase and quadrature despread pilot signals and integrating the in-phase and quadrature pilot signals over a plurality of chip intervals to produce a correlation value;

d) accumulating the correlation value to produce a total sum of accumulated correlation values;

e) repeating the steps (a) to (d) M×N times to produce N total sums of accumulated M correlation values;

f) selecting a plurality of higher correlation values from the N total sums and selecting ones of said phase position signals which correspond to the selected total sums; and g) generating a plurality of orthogonal despreading sequences corresponding to the selected phase position signals and applying said plurality of orthogonal despreading sequences to said demodulators, respectively.

11. A method as claimed in claim 10, further comprising the step of updating the N phase position signals when the steps (a) to (d) are repeated M×N times.

12. A method as claimed in claim 10, wherein the step (a) selects each of the N phase position signal at a rate which corresponds to an interval not exceeding π/2 radian rotation of said in-phase and quadrature pilot signals.

* * * * *